(12) United States Patent
Schlansker et al.

(10) Patent No.: US 8,909,872 B1
(45) Date of Patent: Dec. 9, 2014

(54) COMPUTER SYSTEM WITH COHERENT INTERCONNECTION

(75) Inventors: Michael S. Schlansker, Los Altos, CA (US); Boon Ang, Sunnyvale, CA (US); Erwin Oertli, Mountain View, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 2366 days.

(21) Appl. No.: 11/555,215

(22) Filed: Oct. 31, 2006

(51) Int. Cl.
*G06F 12/00* (2006.01)

(52) U.S. Cl.
USPC ........... 711/141; 711/118; 711/119; 711/120; 711/121; 711/122; 711/128; 711/130; 711/142; 711/143; 711/144; 711/145; 711/146; 711/147

(58) Field of Classification Search
USPC .................. 711/118–122, 128, 130, 141–147
See application file for complete search history.

(56) References Cited

U.S. PATENT DOCUMENTS

| | | | |
|---|---|---|---|
| 6,981,051 B2 | 12/2005 | Eydelman et al. | |
| 6,988,167 B2 * | 1/2006 | Allen et al. | 711/128 |
| 7,003,593 B2 | 2/2006 | Huppenthal et al. | |
| 7,073,026 B2 | 7/2006 | Alsup | |
| 7,127,561 B2 * | 10/2006 | Hill et al. | 711/145 |
| 7,231,470 B2 * | 6/2007 | Huggahalli et al. | 710/33 |
| 7,487,284 B2 * | 2/2009 | Kapur et al. | 710/310 |
| 2006/0080513 A1 | 4/2006 | Beukema et al. | |

OTHER PUBLICATIONS

A. Crouch and J. Du, "Performance Networking Research at Intel China Research Center," Jul. 14, 2005.

* cited by examiner

*Primary Examiner* — Yong Choe
*Assistant Examiner* — Zhuo Li

(57) ABSTRACT

A computer system is provided including a central processing unit having an internal cache, a memory controller is coupled to the central processing unit, and a closely coupled peripheral is coupled to the central processing unit. A coherent interconnection may exist between the internal cache and both the memory controller and the closely coupled peripheral, wherein the coherent interconnection is a bus.

20 Claims, 3 Drawing Sheets

COMPUTER SYSTEM WITH COHERENT INTERCONNECTION

TECHNICAL FIELD

The present invention relates generally to computer system communications, and more particularly to a computer system utilizing a coherent interconnection for network communications.

BACKGROUND ART

Computer networks are an increasingly important part of both private and business environments. Computing devices such as workstations, personal computers, server computers, storage devices, firewalls and other computing devices function as nodes of a network with at least one network element connecting the computing devices. The various nodes transmit and/or receive various kinds of information over the network. Computing devices and users are demanding higher communication speeds across networks as more and more information flows across the various networks. The introduction of new technologies will likely load down networks even more.

In a typical computer system, one or more processors may communicate with input/output (I/O) devices over one or more buses. The I/O devices may be coupled to the processors through an I/O bridge which manages the transfer of information between a peripheral bus connected to the I/O devices and a shared bus connected to the processors. Additionally, the I/O bridge may manage the transfer of information between a system memory and the I/O devices or the system memory and the processors.

Unfortunately, many shared bus systems suffer from drawbacks. For example, multiple devices attached to a bus may present a relatively large electrical capacitance to devices driving signals on the bus. In addition, the multiple attach points on a shared bus produce signal reflections at high signal frequencies which reduce signal integrity. As a result, signal frequencies on the bus are generally kept relatively low in order to maintain signal integrity at an acceptable level. The relatively low signal frequencies reduce signal bandwidth, limiting the performance of devices attached to the bus.

Lack of scalability to larger numbers of devices is another disadvantage of shared bus systems. The available bandwidth of a shared bus is substantially fixed (and may decrease if adding additional devices causes a reduction in signal frequencies upon the bus). Once the bandwidth requirements of the devices attached to the bus (either directly or indirectly) exceeds the available bandwidth of the bus, devices will frequently be stalled when attempting access to the bus, and overall performance of the computer system including the shared bus will most likely be reduced. An example of a shared bus used by many systems is a front side bus (FSB), which may typically interconnect one or more processors and a system controller.

To overcome some of the drawbacks of a shared bus, some computers systems may use packet-based communications between devices or nodes. In such systems, nodes may communicate with each other by exchanging packets of information. In general, a "node" is a device which is capable of participating in transactions upon an interconnect. For example, the interconnect may be packet-based, and the node may be configured to receive and transmit packets. Generally speaking, a "packet" is a communication between two nodes: an initiating or "source" node which transmits the packet and a destination or "target" node which receives the packet.

When a packet reaches the target node, the target node accepts the information conveyed by the packet and processes the information internally. A node located on a communication path between the source and target nodes may relay or forward the packet from the source node to the target node.

The latency of such a system acts as a self limiter of the overall bandwidth. The packet information must reside in memory during the round trip from the source node to the target node and the return of an acknowledge accepting receipt of the information. The current state of the art requires a software driver to pole for a completed transaction. By this mechanism a CPU and the bus associated with it will be dedicated to looping in a tight wait loop until the transaction is complete. This wait loop can be devastating to a multi-processor system. The processor bus is constantly tied-up with queries on the status of the packet.

Thus, a need still remains for a computer system with coherent interconnect. In view of the increasing dependence on clustered compute resources and multi-processor machines, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to save costs, improve efficiencies and performance, and meet competitive pressures, adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

The present invention provides a computer system including a central processing unit having an internal cache, a memory controller that is coupled to the central processing unit, and a closely coupled peripheral that is also coupled to the central processing unit. A coherent interconnection may exist between the internal cache and both the memory controller and the closely coupled peripheral, wherein the coherent interconnection is a bus.

Certain embodiments of the invention have other aspects in addition to or in place of those mentioned above. The aspects will become apparent to those skilled in the art from a reading of the following detailed description when taken with reference to the accompanying drawings.

DETAILED DESCRIPTION

Figure 1:
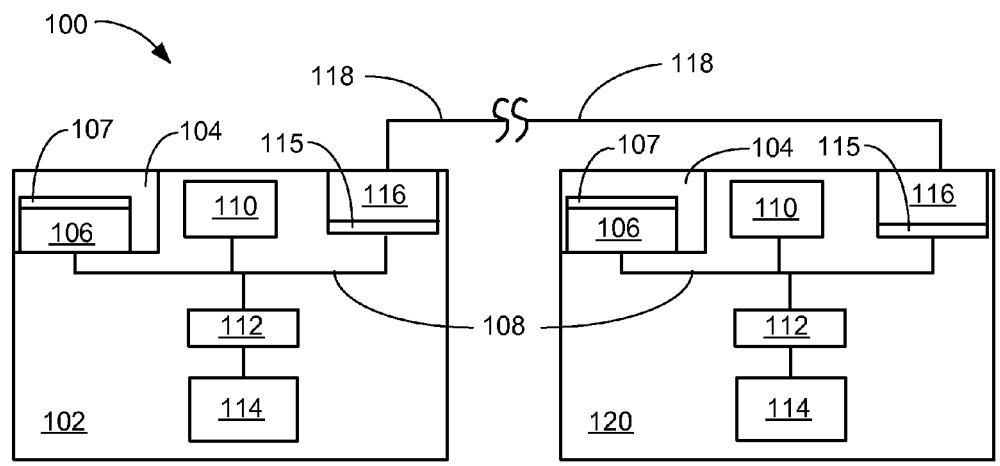
FIG. 1 is a system level block diagram of a computer system with coherent interconnect, in an embodiment of the present invention.

The following embodiments are described in sufficient detail to enable those skilled in the art to make and use the invention. It is to be understood that other embodiments would be evident based on the present disclosure, and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail. Likewise, the drawings showing embodiments of the system are semi-diagrammatic and not to scale and, particularly, some of the dimensions are for the clarity of presentation and are shown greatly exaggerated in the drawing FIGs. Where multiple embodiments are disclosed and described, having some features in common, for clarity and ease of illustration, description, and comprehension thereof, similar and like features one to another will ordinarily be described with like reference numerals.

For expository purposes, the term "horizontal" as used herein is defined as a plane parallel to the plane or surface of the computer system printed circuit board, regardless of its orientation. The term "vertical" refers to a direction perpendicular to the horizontal as just defined. Terms, such as "above", "below", "bottom", "top", "side", "higher", "lower", "upper", "over", and "under", are defined with respect to the horizontal plane. The term "on" means there is direct contact among elements.

Referring now to FIG. 1, therein is shown a system level block diagram of a computer system 100 with coherent interconnect, in an embodiment of the present invention. The system level block diagram of the computer system 100 depicts a first compute device 102 having a central processing unit (CPU) 104, with an internal cache 106 containing a cache line 107, coupled to a bus 108, such as a front side bus, that supports coherent communication. The bus 108 may be coupled to a system cache 110 a memory controller 112, that manages a random access memory (RAM) 114, a buffer line 115, and a closely coupled peripheral 116, such as a network interface controller, a graphics adapter, a communication controller or an encryption block. A network 118 couples the first compute device 102 to at least a second compute device 120 having a construction similar to the first compute device 102. The network 118 may be a wireless network, an optical network, an Ethernet network, or the like.

The closely coupled peripheral 116 is a device that communicates with the CPU 104 and the memory controller 112 through a cache coherency protocol, such as for example the MESI cache protocol. It is understood that the example of the coherency protocol is for the purposes of this discussion and that any suitable coherency protocol may be used. The cache coherency protocol allows the internal cache 106, of the CPU 104, to monitor the status of the memory controller 112, and therefore the RAM 114, as well as the closely coupled peripheral 116 without accessing the bus 108. In the communication between the internal cache 106 and the closely coupled peripheral 116, the cache line 107, in the internal cache 106, is mapped to the buffer line 115, in the closely coupled peripheral 116. When the status of the memory controller 112 or the closely coupled peripheral 116 changes, they utilize the bus 108 to "invalidate" the cached status within the internal cache 106 of the CPU 104. When the CPU 104 interrogates the status of the closely coupled peripheral 116 and detects an invalid status, the CPU 104 will then access the closely coupled peripheral 116 through the bus 108. When the status is refreshed through the bus 108 the CPU 104 then captures the state of the changed status in the internal cache 106.

Figure 2:
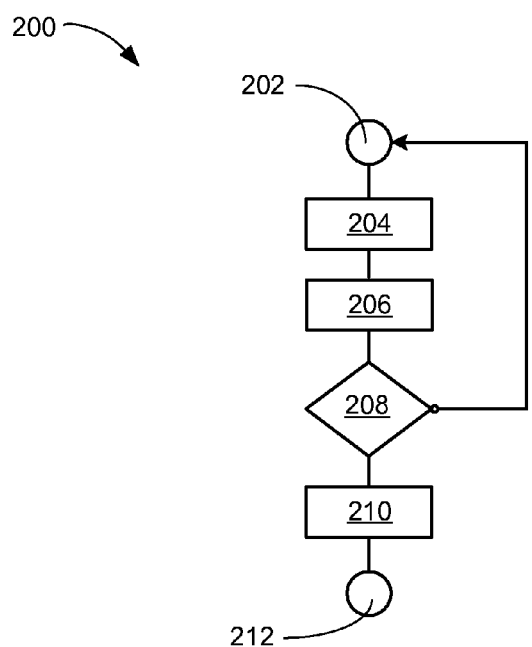
FIG. 2 is a flow diagram of a polling loop for collecting status of the closely coupled peripheral, of FIG. 1, during an information transaction.

Referring now to FIG. 2, therein is shown a flow diagram of a polling loop 200 for collecting status of the closely coupled peripheral 116, of FIG. 1, during an information transaction. The flow diagram of the polling loop 200 depicts a loop entry 202 that is coupled to a read current status 204. The read current status 204 interrogates an image of a set of status registers held in the internal cache 106, of FIG. 1, of the CPU 104, of FIG. 1. The polling loop 200 will not access the bus 108, of FIG. 1, as long as the information in the internal cache 106 is not flagged as invalid. The polling loop 200 does not consume available bandwidth of the bus 108, allowing other devices to access the bus 108 for data transfer or command processing.

The flow progresses from the read current status 204 to a mask current status 206. In the mask current status 206, the CPU 104 applies a mask of the status that was read on the previous iteration of the polling loop 200. The status read may include input FIFO pointers, output FIFO pointers, a cache protocol state, or activity/exception flags. This information would normally reside in the cache line 107, of FIG. 1, in the internal cache 106 of the CPU 104. The device supplying the information may solicit the CPU 104 to refresh the information by modifying the cache protocol state indicator to an invalid state. This operation may be performed without utilizing the bus 108.

The flow then progresses to a test status change 208. The test status change 208 decides whether the status has changed and which direction the polling loop 200 should go. If the status has not changed, the polling loop 200 returns to the loop entry 202 for another iteration. If the status has been modified the flow moves to a retrieve new status 210. The retrieve new status 210 accesses the bus 108 in order to read in new data for the cache line 107 containing the updated status. This access of the bus 108 restores the coherence of the information between the two memories. In an embodiment of the present invention, one of the memories is actually the status interface of the closely coupled peripheral 116, of FIG. 1. By maintaining a coherent interconnection, such as the bus 108, between the internal cache 106, of the CPU 104, and the closely coupled peripheral 116, the bandwidth of the bus 108 is preserved for data transfer or command processing. This is especially important in a multi-processor environment, where more than one of the CPU 104 may be coupled to the bus 108.

The flow then progresses to a polling loop exit 212. The polling loop exit 212 may return to an application program flow to execute an analysis of the current status and performance of whatever service may be required to complete the pending tasks or commands.

Figure 3:
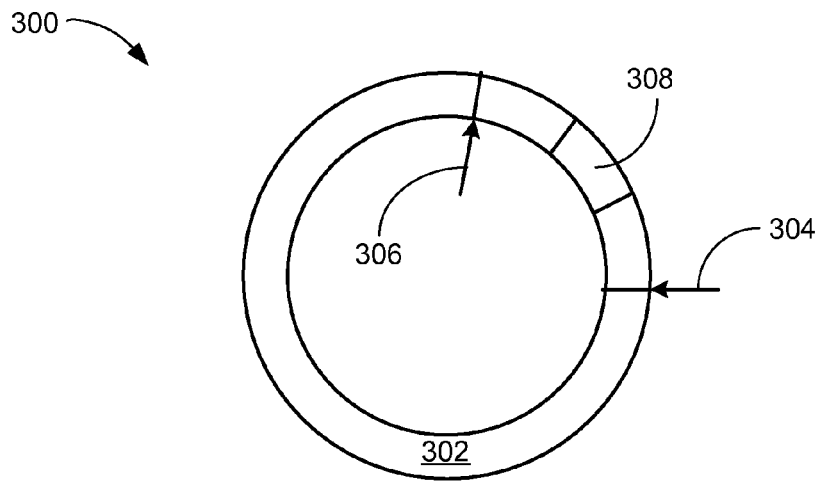
FIG. 3 is a block diagram of a queue for coherent communication, in an embodiment of the present invention.

Referring now to FIG. 3, therein is shown a block diagram of a queue 300 for coherent communication, in an embodiment of the present invention. The block diagram of the queue 300 depicts a buffer memory 302, shown as a circular buffer, having a first pointer 304, a second pointer 306 and a message 308. In one embodiment of the current invention, the queue 300 may be a transmit queue 300. In this embodiment the first pointer 304 may be a head pointer 304 and the second pointer 306 may be a tail pointer 306.

The transmit queue 300 is loaded by a software program, called a driver. The driver copies the message 308 from the RAM 114, of FIG. 1, through the memory controller 112, of FIG. 1, to the buffer memory 302. The message 308 is placed in the buffer adjacent and beyond the second pointer 306, which acts as a tail pointer for the queue 300. When the message 308 is completely loaded in the buffer memory 302, the driver changes the position of the second pointer to the end of the message 308 that was just loaded. The movement of the second pointer 306 then alerts the hardware to the presence of the message 308.

The hardware will execute the transmission of the message 308 that is adjacent to and beyond the first pointer 304. The first pointer 304 acts as a head pointer for the queue 300. As soon as the hardware detects the presence of the message 308, it is copied to a transmit buffer and a re-transmit buffer for processing the message 308 onto the network 118, of FIG. 1, for a destination, which may be the second compute device 120, of FIG. 1. When the message 308 has been completely copied to the transmit buffer, retransmit buffer and sent onto the network 118, the first pointer 304 is moved to the beginning of the message 308 that is next in the queue 300.

This process repeats until the buffer memory 302 is empty. As the message 308 is processed, the driver could completely fill the buffer memory 302. In that case the second pointer 306 would become very close to the first pointer 304. When these values become very close or equal, the driver detects the buffer as full and stops adding additional the message 308. In a high traffic environment, each time the first pointer 304 is moved, the driver may reload the message 308 in the just emptied location of the buffer memory 302. At the completion of loading the message 308, the second pointer 306 would be advanced and once again indicate to the driver that the buffer memory 302 is full.

In another embodiment of the current invention, the queue 300 may be a receive queue. The receive queue operates in a similar fashion to the transmit queue stated above. As the message 308 enters the buffer memory 302 it is stored adjacent to and beyond the second pointer 306. When the message 308 is completely loaded in the buffer memory 302, the second pointer is advanced to the next unused location in the buffer memory 302. When the driver detects that the second pointer 306 has moved, it will copy the message from the queue 300 to the memory controller 112 to be stored in the RAM 114. When the contents of the message 308 are moved into the RAM 114, the first pointer is advanced to the beginning of the message 308 that is next in the queue 300. If the first pointer 304 becomes close to or equal to the second pointer 306, the driver will detect the buffer memory 302 as empty.

If for some reason the queue 300 becomes full during receiving of the message 308, the interface will not acknowledge the message as received. The second compute device 120, as the source of the message, will detect the lack of an acknowledge and re-transmit the message 308 at a later time. In normal operation the transfer of the message 308 to the RAM 114 is faster than the operation of the network 118. In this situation the normal state of the buffer memory 302 would be empty.

Figure 4:
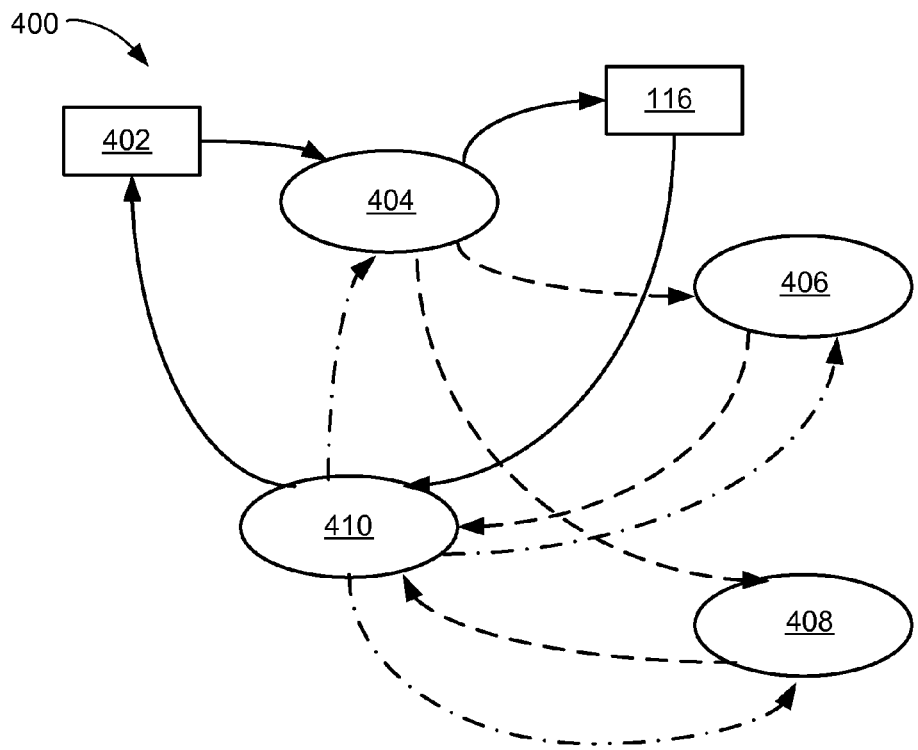
FIG. 4 is a state diagram of a shared memory cache protocol with a closely coupled peripheral.

Referring now to FIG. 4, therein is shown an example of a state diagram of a shared memory cache protocol 400 with the closely coupled peripheral 116, of FIG. 1. The state diagram of the shared memory cache protocol 400 depicts the transactions that take place between the internal cache 106 of the CPU 104 and the buffer line 115 of the closely coupled peripheral 116. An application 402, such as a driver program, manages the operation of the coherent interconnection 108. The protocol discussed is an example of a protocol that might be used for this coherent interconnection. The example protocol may be MESI as used in a popular family of the CPU 104. In the MESI protocol, every one of the cache line 107, of FIG. 1, is marked with one of four states.

A modified state 404, M, indicates that the cache line 107 is present only in the internal cache 106 and is "dirty". The dirty designator means that the value held in the cache line 107 is different from that in a mapped memory that holds the information outside of the CPU 104, of FIG. 1. The cache, which may be the internal cache 106, of FIG. 1, of the CPU 104, of FIG. 1, is required to write the data back to the mapped memory at some time.

An exclusive state 406, E, indicates that the data is present only in the internal cache 106 and it is clean, meaning it matches the content of the mapped memory. The exclusive state 406 means that no other caches hold the data.

A shared state 408, S, indicates that the cache line 107 is present in other caches in the mapped memory. The shared state 408 is common in multi-processor environments.

An invalid state 410, I, indicates the cache line 107 is invalid because it no longer matches the data held in memory. The internal cache 106, of the CPU 104, must re-read the cache line 107 from the mapped memory in order to use the data.

In the context of a coherent interconnection, the internal cache 106 has the cache line 107 that is memory mapped to a status and control registers of the closely coupled peripheral 116. When a command is sent by the application 402 to the closely coupled peripheral 116, the application 402 writes the command to the internal cache 106 of the CPU 104 and sets the modified state 404 in the cache line 107. The example cache protocol implies the cache line 107 be written to the mapped memory, this actually causes an invalid state 410 to be detected within the buffer line 115 in the closely coupled peripheral 116. The closely coupled peripheral 116 then transfers the information in the cache line 107 to the buffer line 115 within the closely coupled peripheral 116 by accessing the bus 108. After the content of the cache line 107 is transferred to the buffer line 115 the cache line 107 state transitions to the shared state 408 completing the cache coherence operation.

In a reverse communication, when the closely coupled peripheral 116 is ready to interact with the application 402, it writes the new status to the buffer line 115, which modifies the state of the cache line 107 to the invalid state 410. When the application 402 detects the cache line 107 is in the invalid state 410, it must read the mapped memory in order to acquire the updated information. This operation requires the access of the bus 108 in order to update the cache line 107 in the internal cache 106 of the CPU 104 with the latest status from the buffer line 115 in the closely coupled peripheral 116. After the content of the buffer line 115 is transferred to the cache line 107 the cache line state transitions to the shared state 408 completing the cache coherence operation.

When the application 402 receives the information from the update, the state may transition to one of the other states depending on the required response from the application 402. For example the modified state 404 may be entered if an immediate response is required, such as sending further information for a transmit operation. If the application 402 must wait for data to be retrieved from the second compute device 120, of FIG. 1, the cache line 107 would enter the shared state 408 or the exclusive state 406 to await the expected response.

When the closely coupled peripheral 116 is ready to once again communicate with the application 402, it would again write the new information to the buffer line 115 to cause the cache line 107 to enter the invalid state 410. The application 402 would once again cause the internal cache 106 to update the cache line 107 by accessing the bus 108 to read the mapped memory, that may be the status and control registers of the closely coupled peripheral 116.

Figure 5:
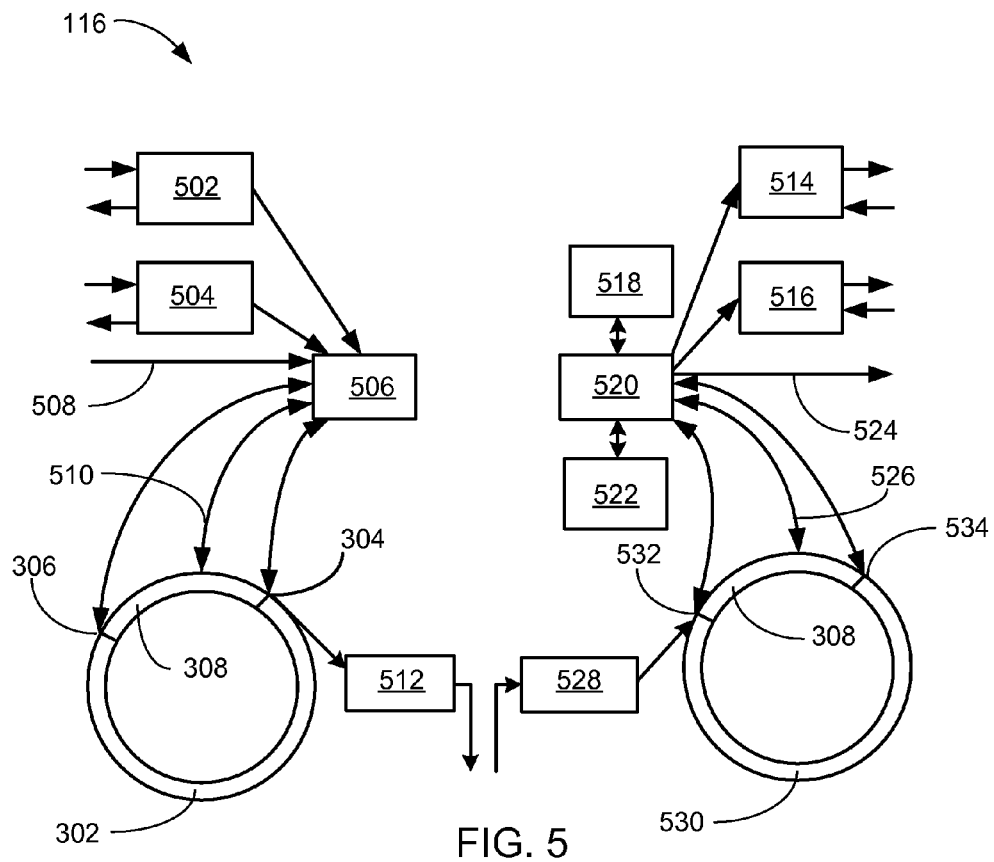
FIG. 5 is a functional block diagram of the closely coupled peripheral in the form of a network interface controller.

Referring now to FIG. 5, therein is shown a functional block diagram of the closely coupled peripheral 116 in the form of a network interface controller. The functional block diagram of the closely coupled peripheral 116 depicts a first application portal 502 and an Nth application portal 504, where N is an integer that is greater than one, coupled to a write queue monitor 506. The write queue monitor 506 also has a bus input 508 that couples the contents of the bus 108, of FIG. 1, to the write queue monitor 506. The write queue monitor 506 is further coupled to the first pointer 304, the second pointer 306, and a write buffer sensor 510.

The first application portal 502 and the Nth application portal 504 each represent an access point for an application that is utilizing the closely coupled peripheral 116. There is no restriction to the number of applications that may concurrently access the closely coupled peripheral 116. The performance will be limited by the ability of the network 118, of FIG. 1, to service the requested bandwidth. The network 118, of FIG. 1, may support other interconnect protocols that are applied as the application 402, of FIG. 4, such as iSCSI or other storage protocols for attachment to the network 118.

The buffer memory 302 accepts the message 308 from the write queue monitor 506. The message 308 is sent from the first pointer 304 to a network transmitter 512 to be sent on the network 118, of FIG. 1. As additional versions of the message 308 are loaded onto the buffer memory 302, the write queue monitor 506 keeps the first application portal 502 appraised of the state of the write operation.

A first read portal 514, an Nth read portal 516, where N is an integer greater than one, and a back-up receive store 518 are coupled to a read queue monitor 520. The read queue monitor is further coupled to a message locator database 522, a first receive pointer 534, a second receive pointer 532, a read buffer sensor 526, and a bus output 524. The message 308 is loaded into a receive buffer memory 530 at the second receive pointer 532, by a network receiver 528. The first read portal 514 and the Nth read portal 516 each represent an access point for an application that is utilizing the closely coupled peripheral 116. There is no restriction to the number of applications that may concurrently access the closely coupled peripheral 116. The performance will be limited by the ability of the network 118, of FIG. 1, to service the requested bandwidth.

Figure 6:
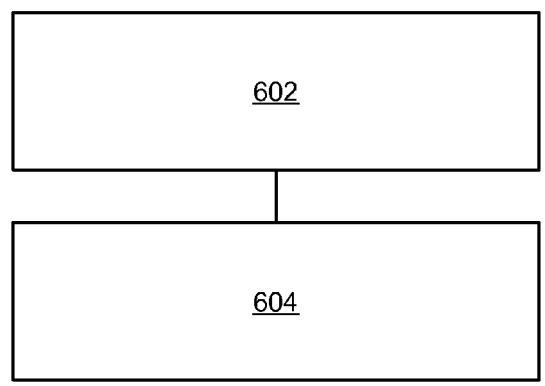
FIG. 6 is a flow chart of an embodiment of a method for operating a computer system with coherent interconnect, in an embodiment of the present invention.

Referring now to FIG. 6, therein is shown a flow chart of an embodiment of a method 600 for operating a computer system with coherent interconnect. The method 600 is discussed in the context of FIG. 1 and FIG. 4 for illustrative purposes. As discussed with respect to FIG. 1 a CPU 104 may poll the status of a closely coupled peripheral 116 1 by establishing 602 a coherent interconnection 108 between the closely coupled peripheral 116 and an internal cache 106 and monitoring 604 the status of the closely coupled peripheral 116 without accessing the bus 108 between the closely coupled peripheral 116 and the internal cache 106. Responsive to a change in the status of the closely coupled peripheral 116, the closely coupled peripheral 116 may access the bus 108 and cause the state of the cache line 107 of FIG. 1, within the internal cache 106 of the CPU 104, to enter an invalid state 410, of FIG. 4. Upon detecting the invalid state 410 of the cache line 107, the CPU 104 will access the bus 108 in order to capture the new status of the closely coupled peripheral 116.

In one aspect, the computer system with coherent interconnection, of the present invention, may decrease the overhead of the front side bus while reducing latency and increasing overall system performance.

Additionally, the present invention of coherent interconnection may be applied to other functions that are adversely effected by system latency, such as graphics controllers or storage interfaces thereby providing increased system performance without adding additional cost to the computer system.

Yet another important aspect of the present invention is that it valuably supports and services the historical trend of reducing costs, simplifying systems, and increasing performance.

While the invention has been described in conjunction with specific embodiments, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operating a computer system comprising:
   establishing a coherent interconnection between a closely coupled peripheral and an internal cache in a central processing unit; and
   monitoring the status of the closely coupled peripheral without accessing a bus coupling the closely coupled peripheral to the internal cache, wherein the coherent interconnection includes the bus.

2. The method as claimed in claim 1 further comprising communicating with an application between the internal cache and the closely coupled peripheral.

3. The method as claimed in claim 1 further comprising:
   mapping a buffer memory in the closely coupled peripheral, a memory controller coupled to the internal cache, and the internal cache as a shared memory cache; and
   executing a shared memory cache protocol in a polling loop without accessing the bus on every iteration of the polling loop.

4. The method as claimed in claim 1 further comprising transferring a message in a buffer memory in the closely coupled peripheral.

5. The method as claimed in claim 1 further comprising managing a write queue monitor and a read queue monitor in the closely coupled peripheral for moving a message between a random access memory coupled to the internal cache and a buffer memory in the closely coupled peripheral.

6. A method of operating a computer system comprising:
   establishing a coherent interconnection between the closely coupled peripheral and an internal cache having a cache line, wherein the internal cache is in a central processing unit;
   monitoring a status of the closely coupled peripheral without accessing a bus coupling the closely coupled peripheral to the internal cache by reading the cache line, wherein the coherent interconnection includes the bus.

7. The method as claimed in claim 6 further comprising communicating with an application between the internal cache and the closely coupled peripheral by applying a storage protocol over a network.

8. The method as claimed in claim 6 further comprising:
   mapping a buffer memory in the closely coupled peripheral, a memory controller coupled to the internal cache, and the internal cache as a shared memory cache;
   executing a shared memory cache protocol in a polling loop without accessing the bus on every iteration of the polling loop; and
   accessing the bus when the polling loop has the internal cache in the invalid state.

9. The method as claimed in claim 6 further comprising transferring a message in a buffer memory (302) in the closely coupled peripheral with the buffer memory coupled to a network transmitter or a network receiver.

10. The method as claimed in claim 6 further comprising managing a write queue monitor and a read queue monitor for moving a message between a random access memory and a buffer memory including:
monitoring a first pointer and a second pointer of the buffer memory by the write queue monitor; and
monitoring a first receive pointer and a second receive pointer of the buffer memory by the read queue monitor.

11. A computer system comprising:
a central processing unit having an internal cache;
a memory controller coupled to the central processing unit;
a closely coupled peripheral coupled to the central processing unit; and
a coherent interconnection between the internal cache and both the memory controller and the closely coupled peripheral, wherein the coherent interconnection is a bus,
wherein the internal cache monitors a status of the closely coupled peripheral without accessing the coherent interconnection.

12. The system as claimed in claim 11 further comprising a buffer memory in the closely coupled peripheral attached to a network transmitter in the closely coupled peripheral.

13. The system as claimed in claim 11 further comprising:
a network connected to the closely coupled peripheral; and
a network transmitter of the closely coupled peripheral coupled to a first pointer of the closely coupled peripheral for sending a message to the network.

14. The system as claimed in claim 11 further comprising:
a buffer memory in the closely coupled peripheral with the buffer memory, the memory controller, and the internal cache mapped as a shared memory cache; and
a shared memory cache protocol, in the central processing unit, in an invalid state for accessing the bus.

15. The system as claimed in claim 11 further comprising a write queue monitor and a read queue monitor in the closely coupled peripheral for moving the message between a random access memory coupled to the memory controller and a buffer memory in the closely coupled peripheral.

16. The system as claimed in claim 11 wherein:
the bus includes a front side bus; and
the closely coupled peripheral includes a network interface controller.

17. The system as claimed in claim 16 further comprising a network transmitter of the closely coupled peripheral connected to a first pointer in the closely coupled peripheral for sending a message on a network connected to a second compute device for receiving the message.

18. The system as claimed in claim 16 further comprising:
a buffer memory in the closely coupled peripheral with the buffer memory, the memory controller, and the internal cache mapped as a shared memory cache to the central processing unit; and
a write queue monitor in the closely coupled peripheral for managing the buffer memory;
a shared memory cache protocol, in the central processing unit, with an invalid state for accessing the coherent interconnection and with a modified state, a shared state, or an exclusive state for not accessing the coherent interconnection.

19. The system as claimed in claim 16 further comprising:
a buffer memory in the closely coupled peripheral attached to a network transmitter in the closely coupled peripheral; and
a network connected between the closely coupled peripheral and a second compute device.

20. The system as claimed in claim 16 further comprising a write queue monitor and a read queue monitor in the closely coupled peripheral for moving a message between a random access memory coupled to the memory controller and a buffer memory in the closely coupled peripheral, wherein the buffer memory includes a bus input and a bus output for moving a message.

* * * * *